United States Patent [19]
Kobale et al.

[11] 4,346,963
[45] Aug. 31, 1982

[54] LIQUID CRYSTAL DISPLAY DEVICE

[75] Inventors: Manfred Kobale, Faistenhaar; Hans Krueger, Munich, both of Fed. Rep. of Germany

[73] Assignee: Siemens Aktiengesellschaft, Berlin & Munich, Fed. Rep. of Germany

[21] Appl. No.: 10,260

[22] Filed: Feb. 6, 1979

[30] Foreign Application Priority Data

Feb. 13, 1978 [DE] Fed. Rep. of Germany ....... 2805970

[51] Int. Cl.³ .......................................... G02F 1/133
[52] U.S. Cl. ................................ 350/344; 350/339 R; 350/349
[58] Field of Search ............... 350/344, 339 R, 334, 350/349

[56] References Cited

U.S. PATENT DOCUMENTS

| | | | |
|---|---|---|---|
| 3,837,730 | 9/1974 | Hatfield et al. | 350/349 |
| 3,932,026 | 1/1976 | Sprokel | 350/339 R |
| 3,939,556 | 2/1976 | Borel et al. | 350/343 X |
| 4,128,313 | 12/1978 | Cole et al. | 350/341 X |
| 4,148,128 | 4/1979 | Feldman | 350/344 X |
| 4,150,878 | 4/1979 | Barzilai et al. | 350/344 |
| 4,235,525 | 11/1980 | Berman et al. | 350/339 R |
| 4,235,526 | 11/1980 | Berman et al. | 350/349 X |

*Primary Examiner*—Edward S. Bauer
*Attorney, Agent, or Firm*—Hill, Van Santen, Steadman, Chiara & Simpson

[57] ABSTRACT

A liquid crystal display device has a pair of carrier plates having a liquid crystal layer therebetween. Electrically conductive coatings are on each plate with at least one of the coatings being subdivided into separate operable segments. Spacing members are in regions of the layer which are not adjacent to the operable segments. Support surfaces are on a facing surface of one of the plates. Spacing elements are on the other plate and project from the facing surface toward and engage the support surfaces so that the thickness of the liquid crystal layer in the region of the support surfaces is less than the thickness of the layer in the area of the operable segments. The support surfaces may be a layer on the surface of one of the carrier plates or may be a surface of the carrier plate defined by recesses etched into the plate, which recesses contain surfaces supporting the operable segments. To ensure contact between the spacing elements and support surfaces, one of the carrier plates can be provided with a layer which has a different coefficient of thermal expansion so that after being applied at an elevated temperature and cooled, the layer will cause the plate to deflect toward the other plate. The support surfaces may be formed by applying different types of layers of material on the surface of the carrier member either in the desired shape or as a continuous layer with the undesired portions being subsequently removed.

15 Claims, 2 Drawing Figures

LIQUID CRYSTAL DISPLAY DEVICE

BACKGROUND OF THE INVENTION

The present invention is directed to a liquid crystal display having a pair of carrier plates spaced apart by a frame to provide a chamber receiving a liquid crystal layer, each of the pair of carrier plates on a surface facing the chamber and engaging the layer being provided with electrically conductive coatings with at least one of the coatings being subdivided into separably operable segments and means for maintaining the spacing between the facing surfaces of the carrier plates. The invention also is directed to different processes of producing the plates with the means for maintaining the spacing.

Liquid crystal displays that are provided with means for maintaining the space between carrier plate are known and constructed in various designs. One example of a design is disclosed in German Pat. No. 21 60 469 and another type is disclosed in U.S. Pat. No. 3,863,332.

since important display characteristic data of a liquid crystal display are impaired with an increasing liquid crystal layer thickness, particularly the increasing of switching times, and the increasing of threshold voltages, it is desirable that the liquid crystal display have the smallest possible spacing between the carrier plates. Plate spacing of less than 10 $\mu m$ and in certain cases even at a maximum of 2 $\mu m$ are currently being required in modern liquid crystal displays. These spacing requirements cannot be readily obtained and usually involve particular production problems when the display is a large area display or has thin wall substrates for the carrier plates.

The above mentioned problems that occur with spacing of the carrier plate, have for some years been the subject of intensive efforts and has lead to a series of proposed solutions. Insomuch as these solutions go further than a pure development of the frame of the display, these contributions may be grouped in one of the two types of categories. The first category or type is the entire volume of the chamber outside of the region of the operative segments is filled with a compound as disclosed in German Pat. No. 21 60 469. The other type or category is providing a plurality of more or less irregularly distributed spacing bodies between the two carrier plates. These spacing bodies may be either granules such as disclosed in German Offenlegungsschrift 21 59 165, which corresponds to British Patent Specification No. 1,337,551; laser produced mounds on a surface of a carrier plate as disclosed in German Pat. No. 23 44 050; or glass solder columns formed between the carrier plates as disclosed in U.S. Pat. No. 4,050,786 on which German Offenlegungsschrift 22 42 389 is based.

Both of these types of solutions have their advantages and disadvantages. The first category or type provides relatively accurate spacing values and facilitates an economic liquid crystal consumption, but, on the other hand, impedes the inroduction of the liquid crystal material into the display device. In the case of the second category or type, although the filling of the chamber with the liquid crystal material does not involve any problems, it does require a larger amount of liquid crystal material. In addition, in the case of using granules or glass solder columns as spacing members between the two plates, the spacing accuracy occasionaly is unsatisfactory. The use of spacing bodies which are created by use of a laser has the disadvantage that this method has not been completely developed. Thus, each type of solution has disadvantages or short comings.

SUMMARY OF THE INVENTION

The present invention is directed to providing a liquid crystal display, which has means for maintaining the spacing between the carrier plates which means combines the advantages of the various known techniques but also on the other hand is free of the above mentioned short comings. To accomplish these tasks, the present invention is directed to an improvement in a liquid crystal display device having a pair of carrier plates spaced apart by a frame to provide a chamber receiving a liquid crystal layer, each of said pair of carrier plates on a surface facing said chamber and engaging said layer being provided with electrically conductive coatings with at least one of these coatings being subdivided into separately operable segments with the areas of the liquid crystal layer being disposed between an operable segment and the other coating and regions of the layer being free of engagement with the operable segments and the means for maintaining the spacing between the facing surfaces of said carrier plates. The improvement comprises said means for maintaining a spacing being located in the regions of the layer free of the operable segments and comprising support surfaces being provided on a facing surface of one of said pair of plates and extending into the chamber toward the other of said pair of plates, and spacing elements being provided on the other of said pair of plates and projecting from the facing surface towards and engaging the support surfaces so that the thickness of the liquid crystal layer in said regions of the support surface is less than the thickness of the layer in the area of said operable segments.

The invention is also directed to a process of producing the spacing members on a surface of the carrier plate which spacing member includes the support surfaces and the spacing element. Two ways of producng the spacing members such as the support surface are by providing the surface of the carrier plate with the layer of material which is either of the desired shape for the support surfaces or has portions removed to obtain the desired shape for the support surfaces. Another method is to provide the carrier plate and to form recesses in the surface of the carrier plate which recesses define the support surfaces.

When providing the layer having the desired shape, the layer may be an organic material, which is either applied by a silk screen printing technique in the desired shape or is a photosensitive material which is exposed and developed to obtain the desired shape. In addition, the spacing member may be formed by silk screening a crystallizing glass solder on the surface of the plate in the pattern of the spacing member and then heating the plate to sinter the glass solder.

The layer may also be applied as a continuous layer on the surface of the carrier plate and then have selected portions removed so that the support surfaces remain with the area of the surface of the plate being free of said layer. In this manner, the layer may be applied by vapor depositing or sputtering a material selected from a group consisting of $SiO_2$, $Al_2O_3$, $CaO$, $Cr_2O_3$ and $MgF_2$ and the removal is accomplished by etching the selected portions of the layer. The layer may also be applied by dipping the surface of the carrier plate into a bath or solution of material selected from a group consisting of SiO$_2$ and SiO$_2$.Al$_2$O$_3$ which layer is subsequently etched to remove the selected portion. The layer can be provided by chemically vapor depositing a layer of material selected from a group consisting of SiO$_2$, SiO$_2$.Al$_2$O$_3$ and SiO$_2$.B$_2$O$_3$ and then removing the selected portion of the material by etching. In addition, the layer may be provided as a mixture of solder glass powder and a photo lacquer material on the surface and removed by exposing the layer of glass solder powder and photo lacquer through a mask, developing the layer, peeling the selected portions of the developed layer from said surface and subsequently heating the plate to sinter the remaining glass powder to form the glassy layer for each of the support surfaces.

When the support surfaces are defined by recesses in the carrier plate, the step of forming the support surface comprises providing a mask of lacquer material in selected areas of the surface of the plate, and sputter etching the exposed portions of the surface of the carrier plate to form the recesses defining the support surface. The step of providing the mask may be by a photo technique including applying a layer of photo lacquer, exposing the photo lacquer so that portions are removed to expose the surface area that is to be etched or may be by silk screening a lacquer mask of the desired pattern on the surface of the plate. In either instance, the method can further include removing the lacquer residue after the etching by a plasma incineration.

In the display device of the present invention, the previously mentioned lines of development for providing spacing members which lines were always followed separately are combined with one another in a specific fashion to overcome the prior short comings and problems. For example, since all the chambers or cavities of the present invention are in communication with one another as a single chamber, the liquid crystal material can be easily inserted into the chamber. Since the liquid crystal layer in the chamber is extremely thin in the areas which are not engaged by the operable segments, the volume of the liquid crystal material required for the device is small. A spacing between a pair of carrier plates with an accuracy of ±1 µm can be obtained by using proven coating processes and/or etching processes in an effortless fashion. It is advantageous that the support surfaces and the support elements, which extend into the cavity between the two carrier plates or substrates divide up the thickness of this cavity and, therefore, it is possible to employ techniques in themselves which would only produce support surfaces or support elements having a height of a few µm such as disclosed by U.S. Pat. No. 3,863,332.

In order to enable the spacing members provided in accordance with the invention to be constantly in engagement with each other and thus enable a given minimum distance between the two carrier plates to be actually obtained, at least one of the substrates should be additionally provided with a coating, which causes it to be deflected toward the other plate by a "bi-metal effect". A mechanical tension of this type will occur when a coating is produced from a material which has a considerably different coefficient of thermal expansion than the coefficient of thermal expansion of the carrier plate and the coating is applied at a relatively high temperature to a surface of the carrier plate. For example, if the coating has a greater coefficient of thermal expansion, it is applied to an outside surface of the carrier plate and if it has a smaller coefficient of thermal expansion, it is applied to a surface that will be an inside or facing surface of the carrier plate.

The advantages of the proposed display are particularly apparent when the display utilizes a particular type of material for the liquid crystal layer. It is known that a cholesteric liquid crystal, which is embedded with homeotropic wall orientation between two substrates and which is normally aligned in planar or focal-conical fashion and only becomes homeotropic upon a specific electrical field strength, is plate-vertically texturized in a field free state as soon as its elemental helixes can no longer fully develop. If one selects a pitch value for the material which is between the thickness of the liquid crystal layer in the segment region and the thickness in the regions of the support surfaces, and if one of the conventional pleochroic dyes is embedded in the layer, the display will be light transmissive in the regions of the support surfaces and the regions of those operable segments which are energized, but will remain colored in the regions of the operable segments which are not energized. This effect will facilitate the representation of colored images on a light or white background in a so-called inverse or complementary drive which has been shown by statistical operations to require a considerably lower power consumption that conventional addressing means.

To accomplish these features, the liquid crystal display, as mentioned hereinabove, should include a drive component and the material of the liquid crystal layer is a cholesteric material containing at least one pleochroic dye, said material having a positive dielectric anisotropy and being homeotropically oriented at its plate parallel boundary surfaces with the helical pitch being selected so that in the area of a non-energized segment the liquid crystal layer has a planar cholesteric or focal-conical orientation and in the remaining area the layer has a homeotropic orientation and the drive component is designed and operated in such a way that the segment electrodes which belong in the background of the selected image are those which are energized. In addition, the helical pitch is preferably selected to be smaller than the thickness of the liquid crystal layer in the area of the operable segments and greater than the thickness of the liquid crystal layer in the regions of the support surfaces.

DESCRIPTION OF THE PREFERRED EMBODIMENTS

Figure 1:
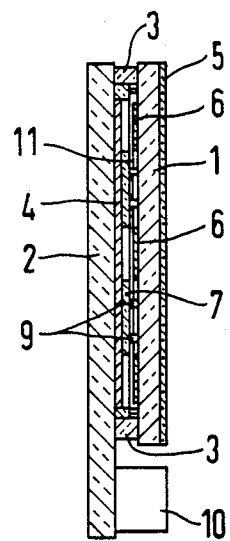
FIG. 1 is a cross-sectional view of a display device in accordance with the present invention.

The principles of the present invention are particularly useful when incorporated in a liquid crystal display device illustrated in FIG. 1. The display device of FIG. 1 is illustrated as a one position, polarizer free seven segment liquid crystal display.

The device includes a front carrier plate 1 and a rear carrier plate 2. The rear plate 2 is equipped with a rear surface producing a diffusing reflection and both plates 1 and 2 are hermetically sealed to one another by a frame 3 to form a chamber 11, which receives a layer of the liquid crystal material. The carrier plates 1 and 2 on the surfaces facing each other and the chamber 11 are provided with electrical conducting coatings 4 and 6. As illustrated, the coating 4 on the rear carrier plate is a continuous conductive coating which forms the rear electrode and the coating 6 on the front carrier plate 1 is subdivided into separately operable segments or electrode segments 6. The rear plate 2 also includes a drive component 10 and the front plate 1 is coated with a film 5 on an exterior surface. The film 5 was applied at an increased temperature and has a much higher coefficient of thermal expansion than the material of the carrier plate 1 so that when the plate and film have cooled to room temperature, the film 5 will cause the plate 1 to be deflected or bent toward the plate 2. Preferably, the film 5 can consist of MgO.

Instead of placing the layer 5 on an exterior surface of the plate 1, it can be provided on a interior or facing surface. In order to have the same deflecting of the plate, the material of the layer is then selected to have a coefficient of thermal expansion which is less than that of the material of the carrier plate so that after it has been applied at an elevated temperature and the plate has cooled to normal temperature, it will deflect the plate toward the surface of the plate 2. An example of a material, which may be used as the interior surface coating, is a material selected from a group consisting of $SiO_2$, $Al_2O_3$ and $SiO_2.Al_2O_3$.

The carrier plates 1 and 2 of the device of FIG. 1 are spaced apart not only by the frame 3 but also by spacing means or means for maintaining the space which includes spacing members composed of support surfaces 7 and spacing elements or supports 9. As illustrated in FIG. 1, the support surfaces 7 are formed by individual layers of a desired contour deposited on the plate 2 and the spacing elements or supports 9 are provided on the carrier plate 1. The spacing means formed by the layers forming the support surface 7 occupy the region of the plate which is between the areas in which the individually operable segments 6 are provided. In the embodiment illustrated, the liquid crystal display device or cell may be dimensioned in such a way that the liquid crystal layer in the chamber 11 will have a thickness of approximately $8 \pm 1$ $\mu$m in the areas of the segments 6 and in the regions adjacent the layers forming the support surfaces 7 will have a thickness of $2 \pm 0.5$ $\mu$m. In this device, each of the carrier plates has a wall thickness of approximately 0.6 mm.

Figure 2:
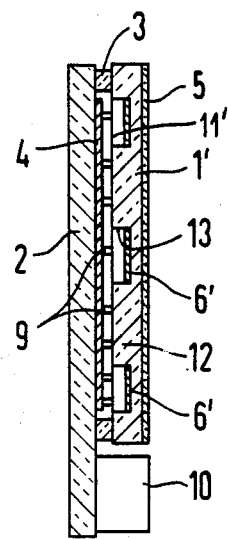
FIG. 2 is a cross-sectional view of an embodiment of a liquid crystal display device of the present invention.

In the embodiment illustrated in FIG. 2, the same numbers are used to describe the same elements or members of the devices. The plate 1' is provided with support surfaces 12. The surfaces 12 are actually the surface of the support plates 1' and are defined by recesses 13 which are etched in the surface of plate 1' and determine the area of each of the support surfaces 12. It also should be noted that each o the recesses 13 contains a flat bottom surface on which a conductive coating segment or segment electrode 6' is formed. Thus, the layer of liquid crystal material in the chamber 11' will have its greatest thickness in the areas of the recess 13, which is adjacent the segment electrode 6' and the smallest thickness in that portion of the chamber which is adjacent the support surfaces 12.

As illustrated, the cavity 11 of FIG. 1 has various portions with those having the greatest thickness being opposite the segment or electrode 6 and the other portions having a much smaller thickness. These regions or portions of either cavity 11 or 11' are all joined together and filled with a single layer of liquid crystal material which can be introduced through a single filling opening, which is not illustrated, in a conventional manner. The liquid crystal fundamentally consists of a nematic substance to which a chiral-nematic additive and pleochroic dye have been added. The mixture possesses a positive dielectric anisotropy and is homeotropically oriented at its plate parallel boundary surfaces. If this texture does not form spontaneously, it is brought about by means of one of the known orientation techniques, which are disclosed in M. Tobias, *International Handbook of Liquid Crystal Displays*, Ovum Press Limited, London, Section 7.2 for example a surfactant for obtaining the alignment. In the liquid crystal mixture, the quality of the chiral-nematic compound, which cholesterically twists or screws the liquid crystal in a helical path, is selected to be such that the pitch of the induced helical twisting assumes a value between the layer thickness in or adjacent the segment 6 or 6' on the one hand and in the other regions which are adjacent the support surfaces 7 or 12. In this case, the liquid crystal molecules of the segment regions apart from the immediate boundary areas are cholesterically oriented whereas they are homeotropic throughout the regions adjacent the support surfaces 7 or 12.

The support surfaces 7, which are illustrated as comprising spacing layers can be produced with an accurately adjusted thickness in various ways. For example, by vaporizing or sputtering of a glass onto the plate 2, by submerging the substrate or plate 2 in a solution, or by chemical vapor deposition (CVD) on the surface of the plate. With the first mentioned technique of the application, it is advisable to use a layer, which consists predominantly of a material selected from a group consisting of $SiO_2$, $Al_2O_3$, CaO, $Cr_2O_3$ and $MgF_2$ which are suitable glasses and are commercially available. When dipping the plate in a solution, the solution is of a material selected from a group consisting of $SiO_2$ or $SiO_2.Al_2O_3$. The coating is produced by the chemical vapor deposition technique, it should preferably consist of a material selected from a group consisting of $SiO_2$, $SiO_2.Al_2O_3$ and $SiO_2.B_2O_3$.

In addition to the above mentioned methods, a silk screen printing or photo technique can also be used. In a silk screen printing method which enables the final structures to be imprinted, it is possible to use a crystallizing glass solder or an organic material. As is known, the glass solder must be sintered following its application. This is accomplished by heating the carrier plate having the pattern of solder to cause sintering thereof. It is also particularly economical to use a coating technique in which a mixture of glass solder powder and a positive or negative photo lacquer is applied by spraying or a so-called roller coating process. To structure this coating, a photo technique is used wherein the layer is exposed through a mask, developed after exposure, and then portions of the developed layer are peeled to free portions of the surface of the coating. Subsequent to the peeling step, the remaining layer is heated to sinter the glass solder and the remaining layer by heating to a temperature of approximately 500° C.

If the support surfaces are formed not by providing a layer such as the layer 7 but are formed by portions 12 of the plate surface which portions are defined by recesses 13, these surfaces can be produced by using a sputter etching technique to form the recesses 13. To accomplish this, the portion of the surface of the carrier plate or substrate, that will form the support surface 12, is covered by a mask which will either be produced from a photo lacquer or will be a silk screen printing lacquer, and then the exposed portions are etched. The residue of the lacquer can be removed after the etching by a plasma incineration. The embodiment of the device of FIG. 2 which has etched recesses 13 with electrodes in the bottom of the recesses, can have the spacing supports 9 formed on the other carrier plate 2 by a coating process. This device can be produced particularly cost favorably.

The display is preferably operated as follows. The only segment electrodes which are to be energized are those which belong to the background of the number which is to be presented. In the region of the energized segments or electrodes and in the regions adjacent the support surfaces 7 and 12, the liquid crystal molecules and also the dye molecules are aligned at right angles to the plate so that the background appears light. In the regions of the segments, such as 6 or 6', which are not energized, the liquid crystal layer retains its planar cholesteric or focal-conical orientation and these regions also appear in the color of the selected dye.

The invention is not limited to the illustrated exemplary embodiments. Thus, for example, it is also possible to construct absorptive displays in which the optical contrast is produced not between color and white but, for example, between colored and colorless or between two different colors. Furthermore, it is immaterial whether the display is operated by reflection or by transmissive means. Operation on the basis of the so-called bistability effect is also conceivable. An example of this type of operation is described in "Berichte der BunsenGesellschaft" 9 (1974), pages 912.

In addition, the skilled technician also has a series of possible variations in the structure of the device at his disposal. For example, it is immaterial whether the spacing layers are applied directly to the surface of the carrier plate or to an already existing or present conducting intermediate coating or plate.

Although various minor modifications may be suggested by those versed in the art, it should be understood that we wish to embody within the scope of the patent warranted hereon, all such modifications as reasonably and properly come within the scope of our contribution to the art.

We claim:

1. In a liquid crystal display device having a pair of carrier plates spaced apart by a frame to provide a chamber receiving a liquid crystal layer, each of said pair of carrier plates on a surface facing said chamber and engaging said layer being provided with electrically conductive coatings with at least one of these coatings being subdivided into separately operable segments with areas of the liquid crystal layer being disposed between an operable segment and the opposite coating and regions of the layer that are not located between an operable segment and the opposite coating, means for maintaining the spacing between the facing surfaces of said carrier plates, and drive circuitry connected to said coatings, the improvements comprising said chamber being constructed to cause said layer to have a thickness in said regions which is less than the thickness of the layer in the areas, said layer being of a cholesteric material containing at least one pleochroic dye, said material having a positive dielectric anisotropy and being homeotropically oriented at its plate parallel boundary surfaces, the helical pitch of the liquid crystal being such that in each of said regions, the liquid crystal layer is continuously homeotropically oriented to provide light transmissive zones, in each area at a non-energized segment, the liquid crystal layer has a planar cholesteric or focal-conical orientation and in each area at an energized segment, the layer has a homeotropic orientation to provide light transmissive zones and said drive circuitry being designed to energize each of the segments which belong in a background of the selected image so that the display operates with a complementary drive.

2. In a liquid crystal display according to claim 1, wherein said means for maintaining the spacing is located in said regions and comprises support surfaces being provided on a facing surface of one of said pair of plates and extending into the chamber toward the other of said pair of plates, and spacing elements being provided on the other of said pair of plates and projecting from the facing surface towards and engaging the support surfaces to insure that the thickness of the liquid crystal layer in said regions is less than the thickness of the layer in the area of said operable segments.

3. In a liquid crystal display device according to claim 2, wherein at least one of the pair of carrier plates on an external surface thereof is provided with a layer composed of a material having a higher coefficient of thermal expansion than the material of the carrier plate, said layer being applied at an elevated temperature so that after cooling to room temperature, said layer deflects the carrier plate towards the other of said pair of carrier plates.

4. In a liquid crystal display device according to claim 3, wherein said layer consists of MgO.

5. In a liquid crystal display device according to claim 2, wherein one of the pair of carrier plates on an internal surface facing the chamber is provided with a layer composed of a material having a coefficient of thermal expansion lower than the coefficient of thermal expansion of said plate, said layer of material being applied at an elevated temperature so that after cooling to ambient temperature, said layer deflects the carrier plate toward the other of the pair of carrier plates.

6. In a liquid crystal display device according to claim 5, wherein said layer is a material selected from a group consisting of $SiO_2$, $Al_2O_3$, and $SiO_2.Al_2O_3$.

7. In a liquid crystal display device according to claim 2, wherein the liquid crystal layer has a thickness of between 6 and 10 $\mu$m in the areas of the operable segments and has a thickness of between 1 and 2 $\mu$m in the region of the support surfaces.

8. In a liquid crystal display device according to claim 2, wherein said support surfaces comprise a layer of material applied to the facing surface of the one carrier plate.

9. In a liquid crystal display device according to claim 2, wherein the support surfaces are defined by recesses in the surface of the one carrier plate, said recesses having surfaces for receiving the operable segments.

10. In a liquid crystal display device according to claim 1, wherein at least one of the pair of carrier plates on an external surface thereof is provided with a layer composed of a material having a higher coefficient of thermal expansion than the material of the carrier plate, said layer being applied at an elevated temperature so that after cooling to room temperature, said layer deflects the carrier plate towards the other of said pair of carrier plates.

11. In a liquid crystal display device according to claim 10, wherein said layer consists of MgO.

12. In a liquid crystal display device according to claim 1, wherein one of the pair of carrier plates on an internal surface facing the chamber is provided with a layer composed of a material having a coefficient of thermal expansion lower than the coefficient of thermal expansion of said plate, said layer of material being applied at an elevated temperature so that after cooling to ambient temperature, said layer deflects the carrier plate toward the other of the pair of carrier plates.

13. In a liquid crystal display device according to claim 12, wherein said layer is a material selected from a group consisting of $SiO_2$, $Al_2O_3$ and $SiO_2.Al_2O_3$.

14. In a liquid crystal display device according to claim 1, wherein the helical pitch is smaller than the thickness of the liquid crystal layer in the area of the operable segments and is greater than the thickness of the liquid crystal layer in said regions.

15. In a liquid crystal display device according to claim 1, wherein the liquid crystal layer has a thickness of between 6 and 10 $\mu$m in the areas of the operable segments and has a thickness of between 1 and 2 $\mu$m in said regions.

* * * * *